(12) United States Patent
Etzel et al.

(10) Patent No.: US 6,377,687 B1
(45) Date of Patent: *Apr. 23, 2002

(54) METHODS AND APPARATUS FOR ENHANCED CMEA EMPLOYING ENHANCED TRANSFORMATIONS

(75) Inventors: Mark H. Etzel, Harvard, MA (US); Robert John Frank, Silver Spring, MD (US); Daniel Nelson Heer, Newton, NH (US); Robert Joseph McNelis, Columbia, MD (US); Semyon B. Mizikovsky, Morganville, NJ (US); Robert John Rance, Andover, MA (US); R. Dale Shipp, Columbia, MD (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/124,300

(22) Filed: Jul. 29, 1998

Related U.S. Application Data

(60) Provisional application No. 60/054,018, filed on Jul. 29, 1997.

(51) Int. Cl.[7] .................................. H04L 9/28
(52) U.S. Cl. .......................... 380/28; 380/42
(58) Field of Search ..................... 380/28, 42

(56) References Cited

U.S. PATENT DOCUMENTS

| | | | | |
|---|---|---|---|---|
| 1,516,180 A | * | 11/1924 | Friedman et al. | 380/57 |
| 1,522,775 A | * | 1/1925 | Friedman et al. | 380/57 |
| 5,159,634 A | * | 10/1992 | Reeds | 380/42 |
| 5,371,796 A | * | 12/1994 | Avarne et al. | 380/23 |
| 5,594,797 A | * | 1/1997 | Alanara et al. | 380/28 |

FOREIGN PATENT DOCUMENTS

| | | | | |
|---|---|---|---|---|
| DE | 19523466 | * | 4/1997 | 380/32 |

OTHER PUBLICATIONS

Vernam, Cipher Printing Telegraph System, AIEE vol. XVI, pp. 109–115, Dec. 31, 1926.*

Wagner, et al., Cryptanalysis of the Cellular Message Encryption Algorithm, 1997.*

Schneier, Applied Cryptography, John Wiley, Chapter 1, Oct. 1995.*

TR45.3 Appendix A to IS–54 Rev B, Dec. 31, 1926.*

* cited by examiner

Primary Examiner—Gail Hayes
Assistant Examiner—James Seal
(74) Attorney, Agent, or Firm—Birch Stewart Kolasch & Birch, LLP

(57) ABSTRACT

Methods and apparatus for enhanced CMEA, or ECMEA, processing. A forward ECMEA and a reverse ECMEA process are provided. The forward ECMEA process decrypts text encrypted by the reverse ECMEA process and the reverse ECMEA process decrypts text encrypted by the forward ECMEA process. The forward ECMEA process employs a transformation, an iteration of the CMEA process, and an inverse transformation. The reverse ECMEA process employs a reverse transformation, an iteration of the CMEA process, and a reverse inverse transformation. The transformations and inverse transformations, and the iteration of the CMEA process, employ secret offsets to improve security. The transformations and the iteration of the CMEA process also employ an enhanced tbox function using an involutary lookup table.

18 Claims, 9 Drawing Sheets

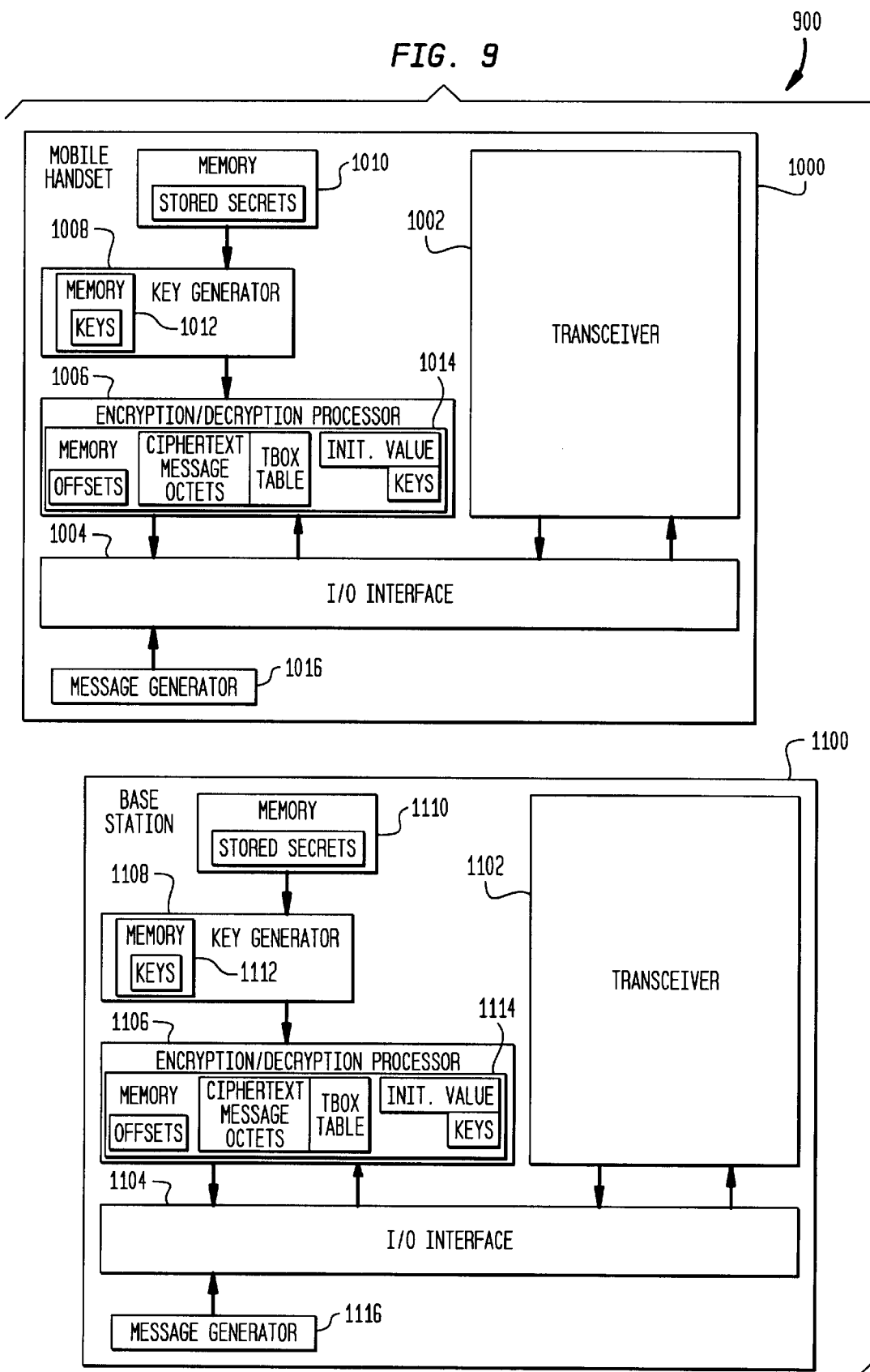

METHODS AND APPARATUS FOR ENHANCED CMEA EMPLOYING ENHANCED TRANSFORMATIONS

This application claims the benefit of U.S. Provisional Application serial No. 60/054,018 filed Jul. 29, 1997. The related application entitled "Methods and Apparatus for Enhanced CMEA Including a CMEA Iteration Preceded by a Transformation and Followed by an Inverse Transformation" and filed on Jul. 22, 1997, is noted and incorporated by reference herein in its entirety.

FIELD OF THE INVENTION

The present invention relates generally to wireless telephone cryptography. More particularly, the invention relates to an improved security cryptosystem for rapid and secure encryption in a wireless telephone system without requiring large amounts of additional system resources.

BACKGROUND OF THE INVENTION

Wireless telephony uses messaging for several purposes including, for example, conveying status information, reconfiguring operating modes, handling call termination, and conveying system and user data such as a subscriber's electronic serial number and telephone number, as well as conversations and other data transmitted by the user. Unlike ordinary wire telephony, in which a central serving station is connected to each subscriber by wire, thus ensuring a fair degree of protection from eavesdropping and tampering by an unauthorized party (attacker), wireless telephone serving stations (i.e., base stations) must transmit and receive messages via signals over the air, regardless of the physical location of the subscribers.

Because the base station must be able to send and receive messages to and from a subscriber anywhere, the messaging process is wholly dependent on signals received from and sent to the subscriber equipment. Because the signals are transmitted over the air, they can be intercepted by an eavesdropper or interloper with the right equipment.

If a signal is transmitted by a wireless telephone in plaintext, a danger exists that an eavesdropper will intercept the signal and use it to impersonate a subscriber, or to intercept private data transmitted by the user. Such private data may include the content of conversations. Private data may also include non-voice data transmitted by the user such as, for example, computer data transmitted over a modem connected to the wireless telephone, and may also include bank account or other private user information transmitted typically by means of keypresses. An eavesdropper listening to a conversation or intercepting non-voice data may obtain private information from the user. The message content of an unencrypted telephone signal (i.e., plaintext signal) is relatively easily intercepted by a suitably adapted receiver.

Alternatively, an interloper can interect himself into an established connection by using a greater transmitting power, sending signals to the base station, and impersonating a party to the conversation.

In the absence of applying cryptography to messages being transmitted by wireless signals, unauthorized use of telephone resources, eavesdropping of messages, and impersonation of called or calling parties during a conversation are possible. Such unauthorized interloping and/or eavesdropping has in fact proven to be a grave problem and is highly undesirable.

The application of cryptography to wireless telephone applications offers a solution to the security problems discussed above, but the application of standard cryptography methods to wireless telephony has encountered significant difficulties due to the computationally-intensive nature of these methods. Specifically, these methods are subject to the constraints imposed by the desire to furnish a small wireless handset and the constraints on processing power imposed by the small size of the handset. The processing power present in typical wireless handsets is insufficient to handle the processing requirements of commonly known cryptographic algorithms such as DES (Data Encryption Standard). Implementing such a commonly known cryptographic algorithm in a typical wireless telephone system would potentially increase the time needed to process signals (i.e., encrypt and decrypt), thereby causing unacceptable delays for subscribers.

One cryptographic system for wireless telephony is disclosed in Reeds U.S. Pat. No. 5,159,634 ("Reeds"), incorporated herein by reference. Reeds describes a cryptographic process known as the CMEA ("Cellular Message Encryption Algorithm") process. Central to the operation of the CMEA is the tbox function, which is a one to one mapping of one octet to another, using a known table and a secret key. Beginning with an initial index, key material is combined with table material in multiple iterations to perform the mapping. The tbox function can be implemented either as a function call or as a static memory-resident tbox table. The tbox table's purpose, when implemented as in the latter case, is to allow significant speed-up of encryption for a given security level.

Enhancements to the CMEA process exist, disclosed in our patent application Ser. No. 09/059,107, entitled "Methods and Apparatus for Multiple-Iteration CMEA Encryption and Decryption for Improved Security for Cellular Telephone Messages" filed on Apr. 13, 1998, and our patent application Ser. No. 09/059,116, entitled "Methods and Apparatus for Enhanced Security Expansion of a Secret Key Into a Lookup Table for Improved Security for Wireless Telephone Messages" filed on Apr. 13, 1998. These enhancements provide significantly increased security to the CMEA process. However, additional enhancements would provide further increased security.

The CMEA process of the prior art may be significantly improved as described in greater detail below. These improvements provide an additional degree of security which is highly advantageous. The cryptographic process of Reeds can be improved through modification and simplification. Either the original process of Reeds, or the modified and simplified process, which will hereinafter be referred to as the modified CMEA, can be used in an improved process including further improvements which are collectively termed ECMEA (Enhanced CMEA).

SUMMARY OF THE INVENTION

The present invention provides an additional degree of security to cryptographic algorithms such as CMEA by providing a forward enhanced CMEA, or ECMEA, process, as well as a reverse ECMEA process. Information encrypted by the forward process is decrypted by the reverse process, and information encrypted by the reverse process is decrypted by the forward process. The forward ECMEA process subjects the message to a transformation before an iteration of the CMEA process, and an inverse transformation after the iteration of the CMEA process. The iteration of the CMEA process may be either the original process of Reeds, or the modified CMEA process. Where the original process of Reeds is meant, the term 'original CMEA' will be used, and where the modified CMEA process is meant, the term 'modified CMEA' will be used. Where the term 'CMEA process' is used without further definition, either the original CMEA or the modified CMEA may be used, the choice being dependent on design preference. It is preferred, however, that the modified CMEA be used unless design preferences suggest otherwise. The iteration of the CMEA process is enhanced by permutation of the inputs to the tbox function by a first secret offset. The tbox function employed by the CMEA process is enhanced through the use of an involutary lookup table. The transformation and inverse transformation employ the first secret offset and a second secret offset. The transformation performs an offset rotation of the first offset and an involutary lookup of each octet, and performs bit-trades between each pair of adjacent octets. For all octets except the last octet, the transformation performs a random octet permutation, which is an exchange between the previous octet and a random one below it. The transformation also performs a final octet permutation, which is an exchange between the last octet and a random one below it.

The inverse transformation performs an initial offset rotation on the second offset, and an initial octet permutation on the last octet, which is an exchange of the last octet with a random one below it. For all octets except the last octet, the inverse transformation performs a random octet permutation, which is an exchange between the octet and a random one below it. The transform performs bit-trades between each pair of adjacent octets, and performs an involutary lookup of each octet followed by an offset rotation of the second offset.

Since the inverse transformation uses the first and second offsets in the opposite order compared to the transformation, the forward ECMEA process as a whole is not self-inverting. In order to decrypt text encrypted by the forward ECMEA process, or to encrypt text for decryption by the forward ECMEA process, a reverse ECMEA process is used. The reverse ECMEA process employs a reverse transformation, followed by an iteration of the CMEA process, followed by a reverse inverse transformation. The reverse transformation is identical to the transformation except that the use of the first and second offsets is reversed. That is, where the transformation uses the first offset, the reverse transformation uses the second offset, and where the transformation uses the second offset, the reverse transformation uses the first offset. Similarly, the reverse inverse transformation is identical to the inverse transformation except that the use of the first and second offsets is reversed. That is, where the inverse transformation uses the first offset, the reverse inverse transformation uses the second offset, and where the inverse transformation uses the second offset, the reverse inverse transformation uses the first offset.

The iteration of the CMEA algorithm may be enhanced by permutation of the inputs to the tbox function by the first secret offset. The tbox function employed by the CMEA algorithm is enhanced through the use of an involutary lookup table.

The forward ECMEA process decrypts text encrypted by the reverse ECMEA process, and the reverse ECMEA process decrypts text encrypted by the forward ECMEA process. The enhancements discussed above improve CMEA, and can be implemented to operate quickly and efficiently in a small computer such as is commonly used in a mobile wireless transceiver.

A cryptographic system according to the present invention may suitably employ the enhanced tbox function, also using first and second offsets to permute inputs to the enhanced tbox function and for use in performing the transformation and reverse transformation and inverse transformation and reverse inverse transformation. Each offset is created using two secret values and an external cryptosync value. The secret values may be generated by any of a number of techniques commonly known in the art. In some applications outside of the wireless area, the external cryptosync value used to encrypt a first message of a call is an initialization vector. Then for subsequent messages, the external cryptosync value is the first two octets of ciphertext from a previously encrypted message.

In another aspect of the present invention, a telephone system according to the present invention includes a mobile station and a base station. Each of the mobile station and the base station generates text and supplies it to an I/O interface which identifies it as generated text and supplies the text and the identification to an encryption/decryption processor, which in turn encrypts the text and supplies it to a transceiver for transmission. When the apparatus receives a transmission via the transceiver, the transmission is identified as incoming ciphertext, and the ciphertext and the identification are supplied to the encryption/decryption processor which decrypts the ciphertext and supplies it as text to the I/O processor for routing to its destination. The mobile station preferably employs the forward ECMEA process and the base station preferably employs the reverse ECMEA process.

A more complete understanding of the present invention, as well as further features and advantages of the invention, will be apparent from the following Detailed Description and the accompanying drawings.

BRIEF DESCRIPTION OF THE DRAWINGS

FIG. 9 is a diagram illustrating a telephone system employing ECMEA processing according to the present invention.

DETAILED DESCRIPTION

Figure 1:
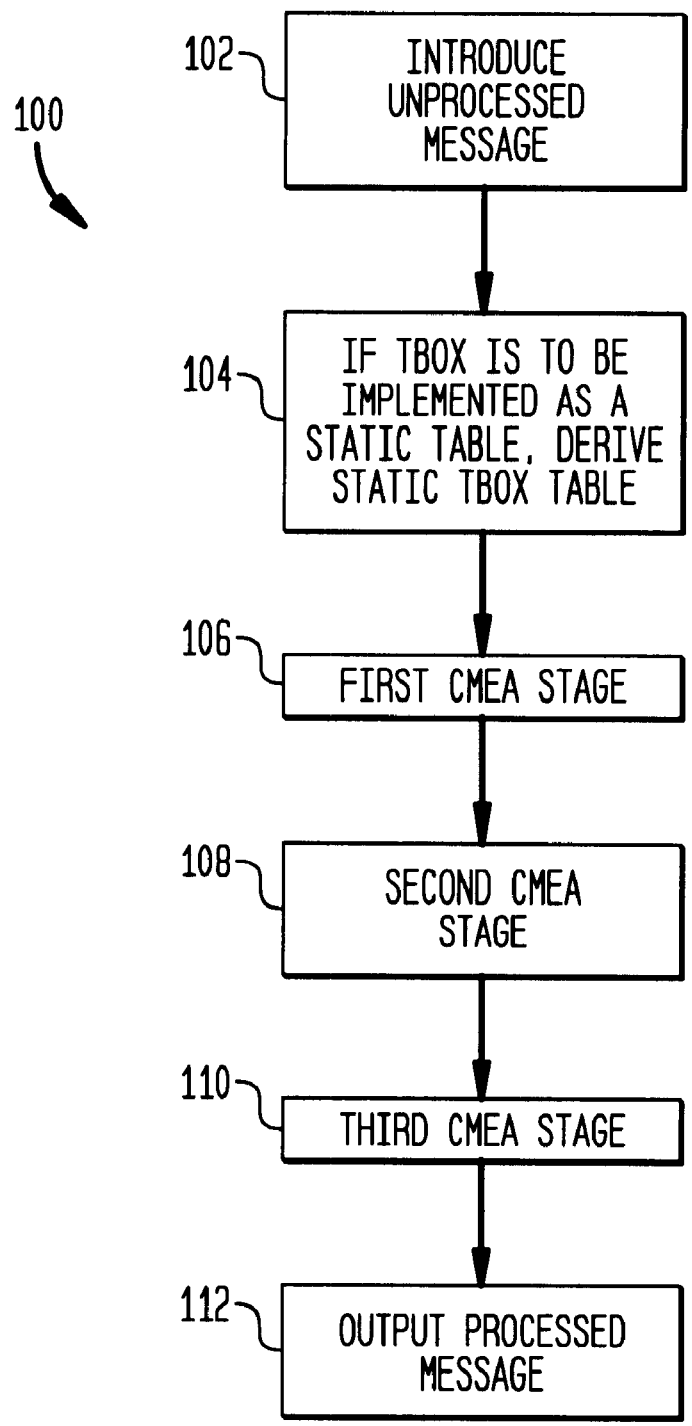
FIG. 1 is a flowchart illustrating aspects of a prior art CMEA cryptographic process and its utilization in a CMEA based implementation of encryption.

FIG. 1 is a flowchart illustrating a prior art method 100 using a CMEA key for encryption of certain critical user data which may be transmitted during a call. The CMEA key is used to create a secret array, tbox(z), of 256 bytes. Alternatively, the tbox function may be implemented as a function call. This reduces the use of RAM, but increases processing time by roughly an order of magnitude.

At step 102, an unprocessed message is introduced. At step 104, in systems which implement tbox as a static table rather than as a function call, the static tbox table is derived. The tbox table is derived as follows:
For each z in the range $0 \leq z < 256$, $$tbox(z)=C(((C(((C((z\ XOR\ k0)+k1)+z)XOR\ k2)+k3)+z)XOR\ k4)+k5)+z)XOR\ k6)+k7)+z,$$

where "+" denotes modulo 256 addition, "XOR" is the is the bitwise boolean Exclusive-OR operator, "z" is the function argument, k0, . . . , k7 comprise the eight octets of the CEMA key, and C( ) is the outcome of a Cellular Authentication, Voice Privacy and Encryption (CAVE) 8-bit table look-up. In the absence of the enhancements discussed below, the tbox function is well known in the art. However, the enhancements discussed in connection with FIGS. 2–5 below enable the tbox function to provide a significantly increased measure of security.

CMEA comprises three successive stages, each of which alters each byte string of a message. Processing may conveniently be carried out on a message stored in a data buffer. At steps 106, 108 and 110, first, second and third stages of the CMEA process are respectively performed, as will be described herein. A data buffer d bytes long, with each byte designated by b(i), for i an integer in the range $0 \leq i < d$, is enciphered in three stages. The first stage (I) of CMEA is as follows:
1. initialize a variable z to zero,
2. For successive integer values of i in the range $0 \leq i < d$
   a. form a variable q by: q=z⊕low order byte of i, where ⊕ is the bitwise boolean
   Exclusive-OR operator,
   b. form variable k by: k=TBOX(q),
   c. update b(i) with: b(i)=b(i)+k mod 256, and
   d. update z with: z=b(i)+z mod 256.

The second stage (II) of CMEA is:
1. for all values of i in the range $0 \leq i < (d-1)/2$: b(i)=b(i)⊕(b(d-1-i) OR 1), where OR is the bitwise boolean OR operator.

The final or third stage (III) of CMEA is the decryption that is inverse of the first stage:
1. Initialize a variable z to zero,
2. For successive integer values of i in the range $0 \leq i < d$
   a. form a variable q by: q=z⊕low order byte of i,
   b. form variable k by: k=TBOX(q),
   c. update z with: z=b(i)+z mod 256, and
   d. update b(i) with b(i)=b(i)−k mod 256.

At step 112, the final processed output is provided.

The above-described CMEA process is self-inverting. That is, the same steps applied in the same order are used both to encrypt plaintext and to decrypt ciphertext. Therefore, there is no need to determine whether encryption or decryption is being carried out. Unfortunately, it has been shown that the above-described CMEA process may be subject to an attack which will allow recovery of the CMEA key used for a call.

Figure 2:
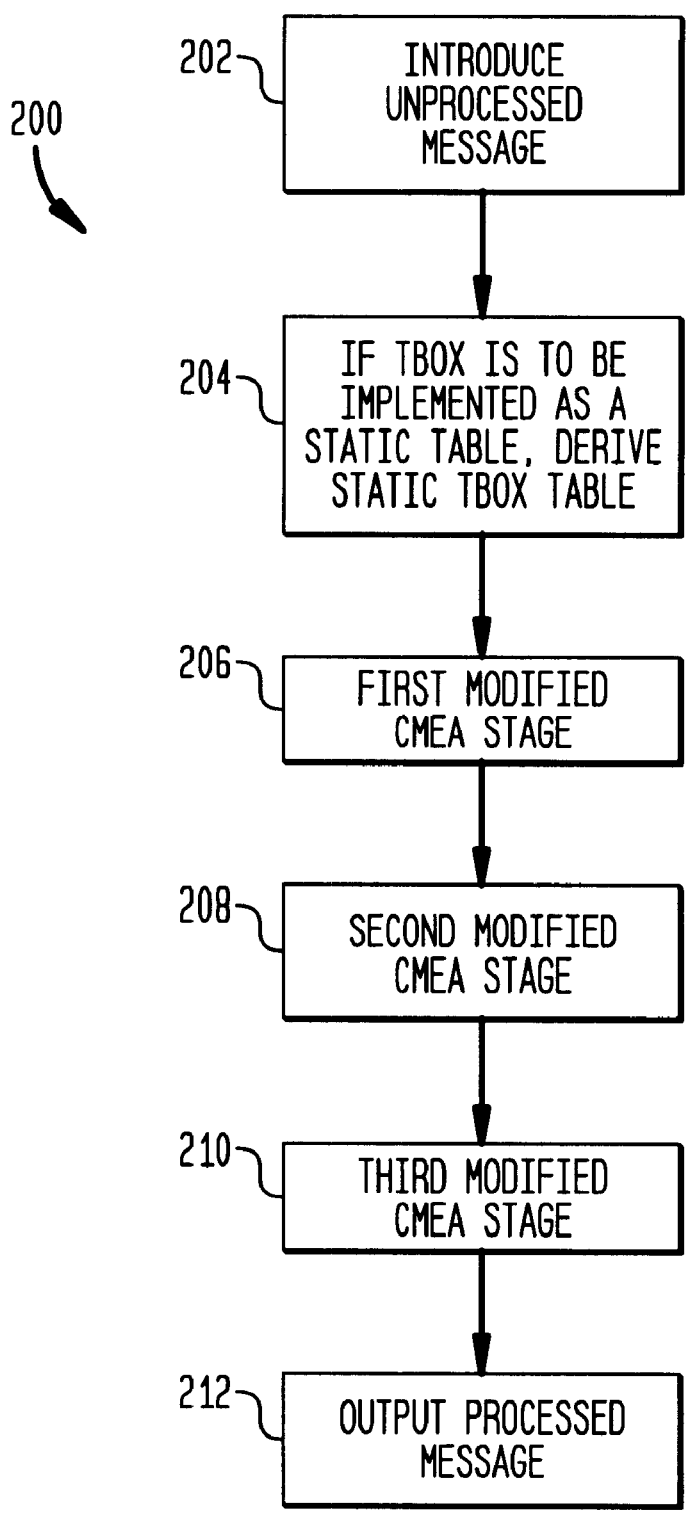
FIG. 2 is a flowchart illustrating a modified CMEA cryptographic process.

FIG. 2 is a flowchart illustrating a modified CMEA process 200 comprising a modification of the prior art method 100 illustrated in FIG. 1. The modified CMEA process 200 uses a CMEA key for encryption of certain critical user data which may be transmitted during a call. The CMEA key is used to create a secret array, tbox(z), of 256 bytes. Alternatively, the tbox function may be implemented as a function call. This reduces the use of RAM, but increases processing time by roughly an order of magnitude.

At step 202, an unprocessed message is introduced. At step 204, in systems which implement tbox as a static table rather than as a function call, the static tbox table is derived. The tbox table is modified from the prior art and will be described in detail later.

Modified CMEA comprises three successive stages, each of which alters each byte string of a message. The message may conveniently be placed in a data buffer for processing. At steps 206, 208 and 210, first, second and third stages of the CMEA process are respectively performed, as will be described herein. A data buffer $n_{max}$ bytes long, with each byte designated by b(i), for i an integer in the range $0 \leq i < n_{max}$, is enciphered in three stages. The first stage (I) of the modified CMEA is as follows:
1. Initialize a variable z to zero,
2. For successive integer values of i in the range $0 \leq i < n_{max}$
   a. form a variable q by: q=z⊕offset1, where ⊕ is the bitwise boolean Exclusive-OR operator, and offset1 is an 8-bit secret value to be defined later.
   b. form variable k by: k=TBOX(q),
   c. update b(i) with: b(i)=b(i)+k mod 256, and
   d. update z with: z=b(i).

The second stage (II) of the modified CMEA is:
1. for all values of i and i+1 in the range $0 \leq i < nmax-1$, i even:

b(i)=b(i)⊕b(i+1).

The final or third stage (III) of the modified CMEA is the decryption that is inverse of the first stage:
1. Initialize a variable z to zero,
2. For successive integer values of i in the range $0 \leq i < n_{max}$
   a. form a variable q by: q=z⊕offset1,
   b. form variable k by: k=TBOX(q),
   c. update z with: z=b(i), and
   d. update b(i) with b(i)=b(i)−k mod 256.

At step 112, the final processed output is provided.

The above-described modified CMEA process is self-inverting. That is, the same steps applied in the same order are used both to encrypt plaintext messages and to decrypt ciphertext messages. Therefore, there is no need to determine whether encryption or decryption is being carried out. Unfortunately, it has been shown that the original CMEA process described in connection with FIG. 1, and thus the above-described modified CMEA process, may be subject to an attack which will allow recovery of the CMEA key used for a call.

In order to provide added security to customer information, an encryption system according to the present invention employs a CMEA process iteration employing an enhanced tbox function employing an involutary lookup table. The CMEA process iteration may be the original CMEA process illustrated in FIG. 1 or the modified CMEA process illustrated in FIG. 2. The encryption system also improves the use of the tbox function by permuting the inputs to the tbox function by secret offsets. Additional security is provided by applying transformations to a message before and after the CMEA iteration.

Figure 3:
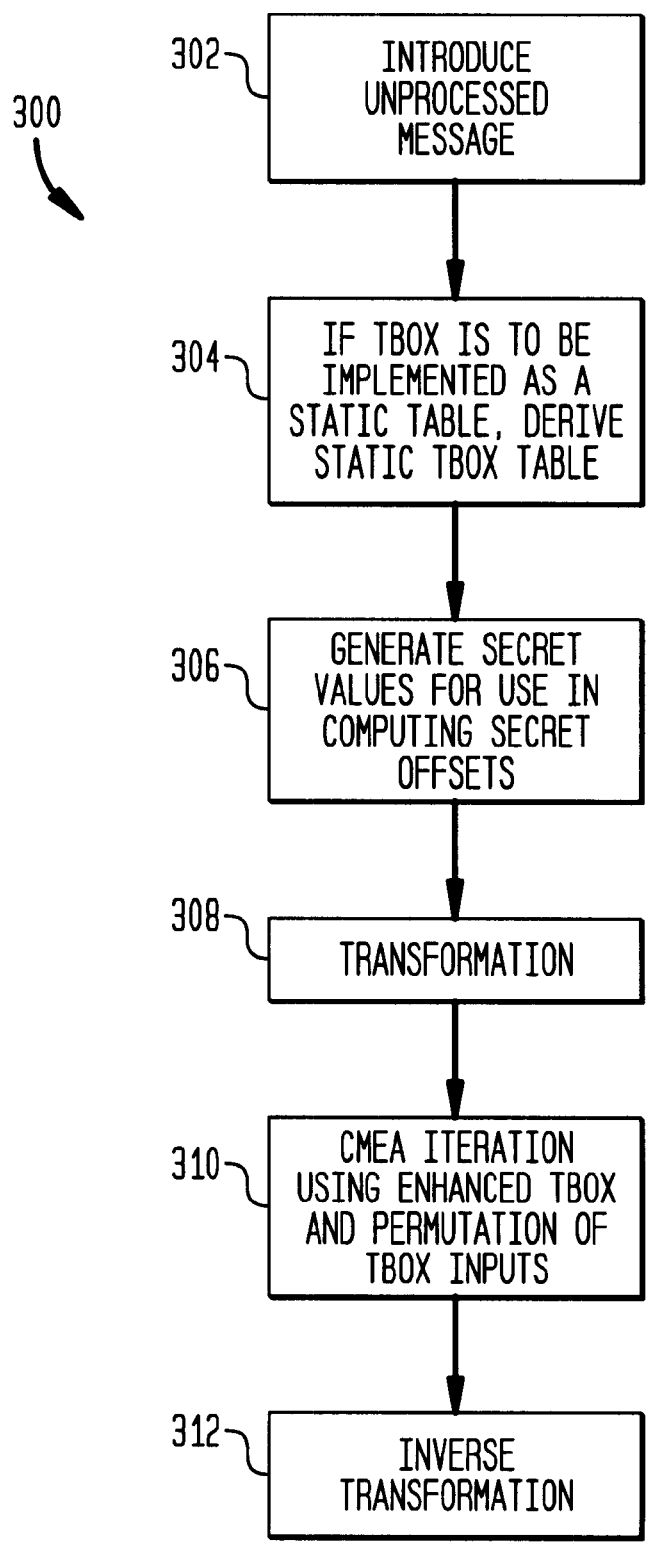
FIG. 3 is a flowchart illustrating a forward ECMEA encryption method according to the present invention, employing a transformation, a CMEA process in which an enhanced tbox function employing involutary lookup is employed with the inputs to the enhanced tbox function being permuted by a secret offset, and an inverse transformation.

FIG. 3 is a flowchart showing an enhanced ECMEA encryption/decryption process 300 according to the present invention. At step 302, an unprocessed message is introduced into the encryption/decryption process. The unprocessed message may be a plaintext message to be encrypted for transmission, or a received encrypted message to be decrypted. The unprocessed message may conveniently be placed in a data buffer for processing. At step 304, in systems which implement tbox as a static table rather than as a function call, the static tbox table is derived. At step 306, a set of secret values $K_0$–$K_3$ is generated for use in generating the secret offsets, and the offsets are calculated. The secret values $K_0$–$K_3$ are preferably octets. The set of secret values may be generated using any of a number of techniques commonly known in the art. All the secret values $K_0$–$K_3$ are preferably generated for each wireless telephone call and are preferably constant throughout the call. First and second offsets are generated, using the following formulas:

$$\text{offset1} = ((K_0+1) * CS \bmod 257) \oplus K_1 \bmod 256$$

$$\text{offset2} = ((K_2+1) * CS \bmod 257) \oplus K_3 \bmod 256$$

where $K_0$–$K_3$ are as defined above. CS is preferably an octet implemented as a binary counter. Offset1 and offset2 are each 8-bit values.

At step 308, a transformation is performed on the message, using first and second secret offsets, to produce a transformed message. Details of the transformation are discussed below in connection with the discussion of FIG. 4.

At step 310, the transformed message is subjected to an iteration of the CMEA process, using a CMEA key, to produce an intermediate ciphertext message. The CMEA process used may be the original CMEA process of Reeds, described in connection with FIG. 1, or the modified CMEA process described in connection with FIG. 2. The iteration of the CMEA process is enhanced by inclusion of an enhanced tbox function, which performs an involutary lookup of each octet, and is given by the formula $$\text{tbox}(z) = I(I(I(I(I(I(I(I(I(I(I(I(z+k0) \text{XOR } k1) + k2) \text{XOR } k3) + k4) \text{XOR } k5) + k6) \text{XOR } k7) - k6) \text{XOR } k5) - k4) \text{XOR } k3) - k2) \text{XOR } k1) - k0$$

where "+" denotes modulo 256 addition,
"−" denotes modulo 256 subtraction,
"XOR" is the XOR function,
"z" is the function argument,
k0, . . . , k7 are the eight octets of ECMEA key,
and I( ) is the outcome of the known ibox 8-bit table look-up. The ibox table is an involutary lookup table with entries chosen to perform involutary mapping of 8-bit bytes onto 8-bit bytes. A preferred example of an ibox table is as follows:

| | | | | | | | |
|---|---|---|---|---|---|---|---|
| 0xdd, | 0xf3, | 0xf7, | 0x90, | 0x0b, | 0xf5, | 0x1a, | 0x48, |
| 0x20, | 0x3c, | 0x84, | 0x04, | 0x19, | 0x16, | 0x22, | 0x47, |
| 0x6d, | 0xa8, | 0x8e, | 0xc8, | 0x9f, | 0x8d, | 0x0d, | 0xb5, |
| 0xc2, | 0x0c, | 0x06, | 0x2f, | 0x43, | 0x60, | 0xf0, | 0xa4, |
| 0x08, | 0x99, | 0x0e, | 0x36, | 0x98, | 0x3d, | 0x2e, | 0x81, |
| 0xcb, | 0xab, | 0x5c, | 0xd5, | 0x3f, | 0xee, | 0x26, | 0x1b, |
| 0x94, | 0xd9, | 0xfc, | 0x68, | 0xde, | 0xcd, | 0x23, | 0xed, |
| 0x96, | 0xc5, | 0xdc, | 0x45, | 0x09, | 0x25, | 0x4f, | 0x2c, |
| 0x62, | 0x53, | 0xbf, | 0x1c, | 0x95, | 0x3b, | 0x89, | 0x0f, |
| 0x07, | 0x56, | 0x7f, | 0xbd, | 0xaa, | 0xb7, | 0xff, | 0x3e, |
| 0x86, | 0x77, | 0x54, | 0x41, | 0x52, | 0xd4, | 0x49, | 0xb8, |
| 0xc7, | 0x9e, | 0x82, | 0x71, | 0x2a, | 0xd0, | 0x78, | 0x9c, |
| 0x1d, | 0x6a, | 0x40, | 0xae, | 0xf4, | 0xaf, | 0xf2, | 0xe9, |
| 0x33, | 0x80, | 0x61, | 0xb4, | 0xc0, | 0x10, | 0xa7, | 0xbb, |
| 0xb6, | 0x5b, | 0x73, | 0x72, | 0x79, | 0x7c, | 0x8c, | 0x51, |
| 0x5e, | 0x74, | 0xfb, | 0xe6, | 0x75, | 0xd6, | 0xef, | 0x4a, |
| 0x69, | 0x27, | 0x5a, | 0xb3, | 0x0a, | 0xe8, | 0x50, | 0xa0, |
| 0xca, | 0x46, | 0xc3, | 0xea, | 0x76, | 0x15, | 0x12, | 0xc6, |
| 0x03, | 0x97, | 0xa3, | 0xd1, | 0x30, | 0x44, | 0x38, | 0x91, |
| 0x24, | 0x21, | 0xc1, | 0xdb, | 0x5f, | 0xe3, | 0x59, | 0x14, |
| 0x87, | 0xa2, | 0xa1, | 0x92, | 0x1f, | 0xe2, | 0xbc, | 0x6e, |
| 0x11, | 0xbe, | 0x4c, | 0x29, | 0xe4, | 0xc9, | 0x63, | 0x65, |
| 0xcc, | 0xfa, | 0xf1, | 0x83, | 0x6b, | 0x17, | 0x70, | 0x4d, |
| 0x57, | 0xd3, | 0xfe, | 0x6f, | 0xa6, | 0x4b, | 0xa9, | 0x42, |
| 0x6c, | 0x9a, | 0x18, | 0x8a, | 0xd2, | 0x39, | 0x8f, | 0x58, |
| 0x13, | 0xad, | 0x88, | 0x28, | 0xb0, | 0x35, | 0xd7, | 0xe1, |
| 0x5d, | 0x93, | 0xc4, | 0xb9, | 0x55, | 0x2b, | 0x7d, | 0xce, |
| 0xe0, | 0x31, | 0xfd, | 0x9b, | 0x3a, | 0x00, | 0x34, | 0xe5, |
| 0xd8, | 0xcf, | 0xa5, | 0x9d, | 0xac, | 0xdf, | 0x7b, | 0xf9, |
| 0x85, | 0x67, | 0x8b, | 0xf6, | 0xf8, | 0x37, | 0x2d, | 0x7e, |
| 0x1e, | 0xb2, | 0x66, | 0x01, | 0x64, | 0x05, | 0xeb, | 0x02, |
| 0xec, | 0xe7, | 0xb1, | 0x7a, | 0x32, | 0xda, | 0xba, | 0x4e | where the entries are in hexadecimal format. The ibox table entries are indexed from 0x00 to 0xff. This translates into decimal 0 to 255. For the above table, the first entry in the first row is indexed 0x00, the eighth entry in the first row is indexed 0x07, the first entry in the second row is indexed 0x08, the eighth entry in the second row is indexed 0x0f, and so on. It is apparent from an examination of the table that it provides an involutary lookup. That is, ibox(ibox((z))=z. For example, ibox(0x00)=0xdd. Looking up the entry indexed 0xdd, it is seen that ibox(0xdd)=0x00. The enhanced tbox function is substituted for the TBOX function described above in connection with the discussion of FIG. 1 and FIG. 2.

In order to further enhance security, the inputs to the tbox function are subjected to a permutation employing the secret offsets. Each tbox function input is subjected to a permutation to produce a permutation result. For use in the iteration of the CMEA process, the first offset is used. If a tbox function input is defined as x, for example, the permutation result is the value of (x⊕offset1) for tbox use in the CMEA processing. When the tbox function is used in the transformations or inverse transformations, one would use either (x⊕offset1) or (x⊕offset2), depending upon where it is located within the tbox function. Each of the transformations and inverse transformations, including the use of tbox permutations within the transformations and inverse transformations, is described in detail below. Each permutation result is subjected to the tbox function. Thus, for each tbox input x, the function used is tbox(x⊕offset1) or tbox(x⊕offset2). The permutation of the tbox inputs effectively causes the location of the tbox entries to shift with each message, greatly increasing the difficulty of a cryptanalytic attack.

At step 312, the intermediate ciphertext is subjected to an inverse transformation, using first and second secret offsets, to produce a final processed message. The inverse transformation is described below in connection with the discussion of FIG. 5.

Figure 4:
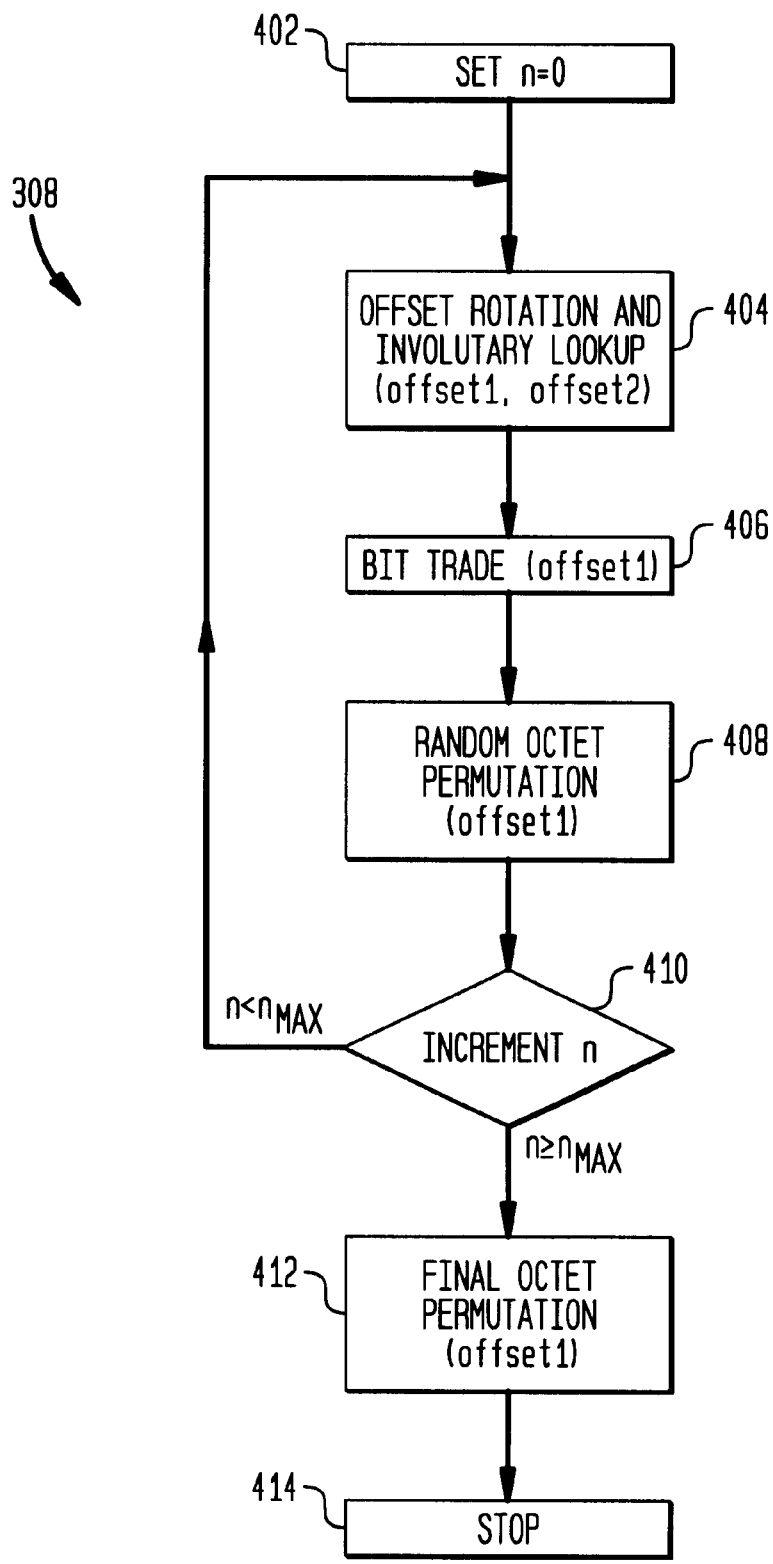
FIG. 4 is a flowchart illustrating the transformation employed in the forward ECMEA encryption method.

FIG. 4 is a flowchart illustrating in detail the steps of the transformation 308 performed in the forward ECMEA process 300 illustrated in FIG. 3. The steps of the transformation 308 are performed for each octet $O_n$. n is an integer from 0 to $n_{max}-1$, where $n_{max}$ is the number of octets in the message.

At step 402 n is set to 0. At step 404 an offset rotation and involutary lookup is performed according to the following formula:

if n>0, offset1=(offset1>>1) OR (offset1<<7)

$O_n$=offset2⊕tbox($O_n$⊕offset1)

where $O_n$ is the nth octet of the unprocessed message, >>1 represents a right-shift of 1 bit, and <<7 represents a left-shift of 7 bits. These two shifts and the subsequent OR in the corresponding line above comprise a one-bit rotation to the right.

At step 406 a bit-trade is performed between the present octet and the one below according to the following formula:

if n>0, $j=O_{n-1} \oplus O_n$ j=j AND tbox(j⊕offset1)

$O_{n-1}=O_{n-1} \oplus j$ $O_n=O_n \oplus j$ where j is a temporary buffer variable.

At step 408 a random octet permutation is performed to perform an exchange of the (n−1)th octet with a random one below it, according to the following formula:

if n>1, $j=tbox(O_n \oplus offset1)$ $j=(n*j)>>8$ $z=O_j$ $O_j=O_{n-1}$ $O_{n-1}=z$ where j and z are temporary buffer variables.

At step 410 n is incremented and compared with $n_{max}$. If $n<n_{max}$, control is transferred to step 404. If $n \geq n_{max}$, control is transferred to step 412.

At step 412, a final random octet permutation to exchange the last octet with a random one below it, is performed according to the following formula:

$j=tbox(0x37 \oplus offset1)$ $j=(n*j)>>8$ $z=O_j$ $O_j=O_{n-1}$ $O_{n-1}=z$ where j and z are temporary buffer variables.

At step 414 the transformation is complete.

Figure 5:
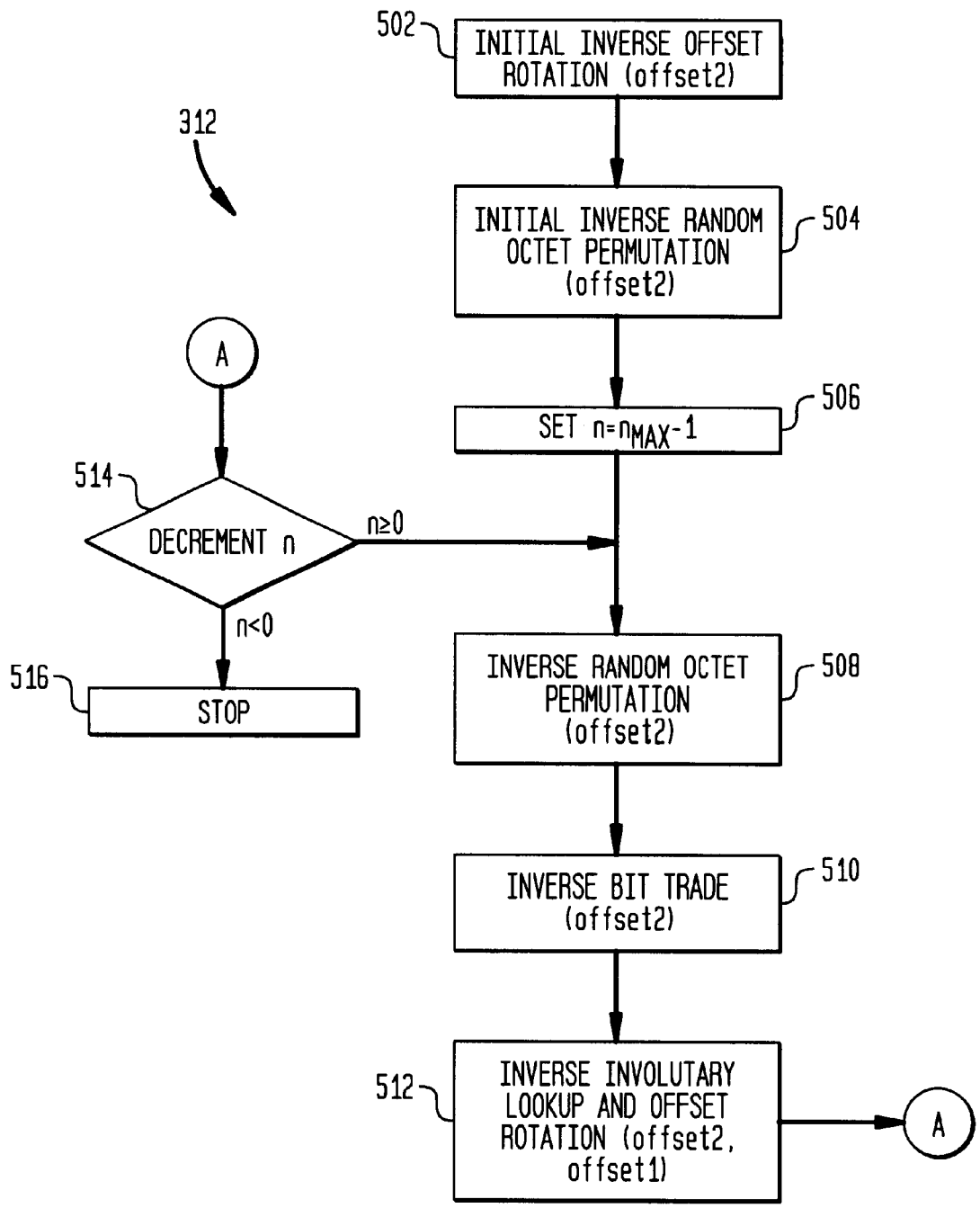
FIG. 5 is a flowchart illustrating the inverse transformation employed in the forward ECMEA cryption method.

FIG. 5 is a flowchart illustrating in detail the steps of the inverse transformation 312 performed in the forward ECMEA process 300 illustrated in FIG. 3. The steps of the transformation 312 are performed for each octet $O_n$, where $O_n$ is the nth octet of the intermediate ciphertext message. n is an integer from 0 to $n_{max}-1$, where $n_{max}$ is the number of octets in the message.

At step 502 an initial inverse offset rotation is performed for offset2 according to the following formula:

$j=(n_{max}-1)$ AND 0x07 offset2=(offset2>>j) OR (offset2<<(8−j))

where >>j represents a right-shift of j bits, and <<(8−j) represents a left-shift of (8—j) bits. These two shifts and the subsequent OR in the corresponding line above comprise a j-bit rotation to the right.

At step 504 an initial inverse random octet permutation is performed, to exchange the last octet with a random one below it, according to the following formula:

$j=tbox(0x37 \oplus offset2)$ $j=(n_{max}*j)>>8$ $z=O_j$ $O_j=O_{nmax-1}$ $O_{nmax}=z$ where j and z are temporary buffer variables.

At step 506 n is set to $n_{max}-1$.

At step 508 an inverse random octet permutation is performed to exchange the (n−1)th octet with a random one below it, according to the following formula:

if n>1, $j=tbox(O_n \oplus offset2)$ $j=(n*j)>>8$ $z=O_j$ $O_j O_{n-1}$ $O_{n-1-z}$ where j and z are temporary buffer variables.

At step 510 an-inverse bit-trade is performed between the present octet and the one below according to the following formula:

if n>0, $j=O_{n-1} \oplus O_n$ j=j AND tbox(j⊕offset2)

$O_{n-1}=O_{n-1} \oplus j$ $O_n=O_n \oplus j$ where j is a temporary buffer variable.

At step 512 an inverse involutary lookup of the present octet and an inverse offset rotation is performed, according to the following formula:

$O_n=offset2 \oplus tbox(O_n \oplus offset1)$ offset2=(offset2<<1) OR (offset2>>7)

where <<1 represents a left-shift of 1 bit, and >>7 represents a right-shift of 7 bits. These two shifts and the subsequent OR in the corresponding line above comprise a one-bit rotation to the left.

At step 514 n is decremented and compared to 0. If n≧0 control is transferred to step 508. If n<0 control is transferred to step 516 and the inverse transformation is completed.

Figure 6:
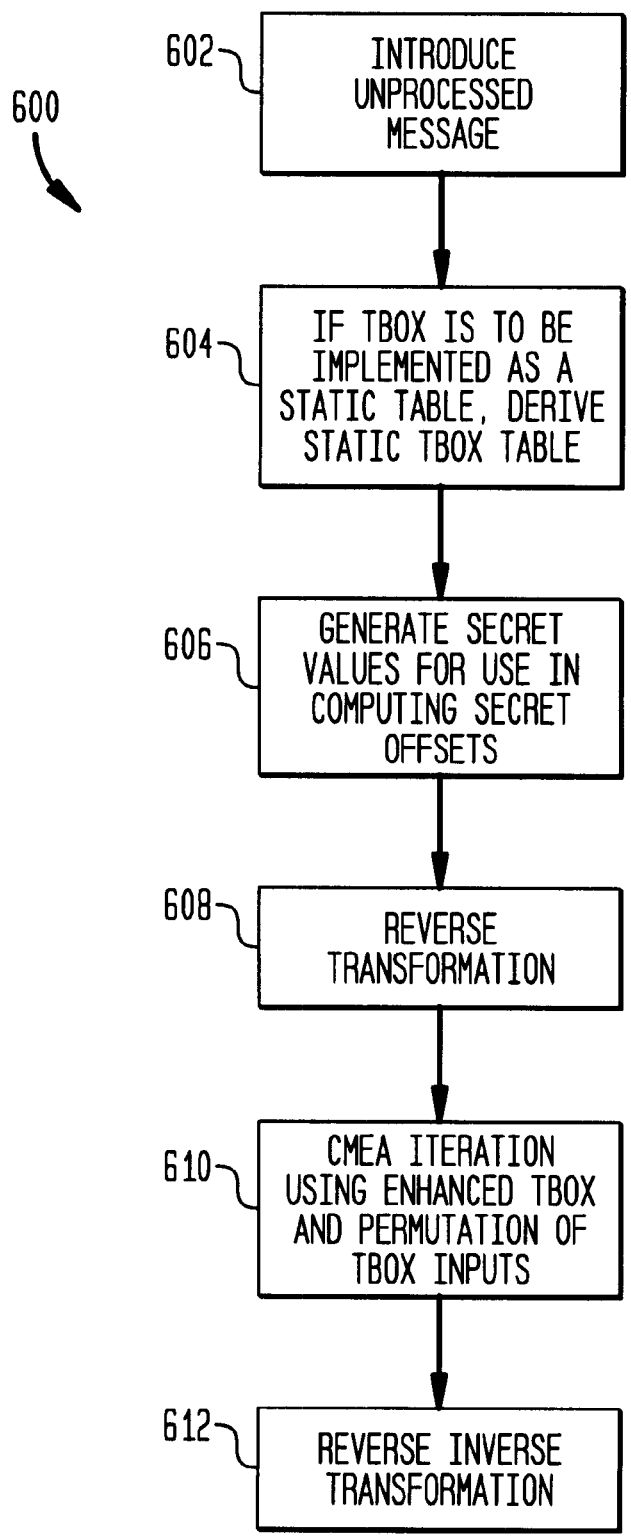
FIG. 6 is a flowchart illustrating a reverse ECMEA encryption method according to the present invention, employing a reverse transformation, a CMEA process in which an enhanced tbox function employing involutary lookup is employed with the inputs to the enhanced tbox function being permuted by a secret offset, and a reverse inverse transformation.

FIG. 6 is a flowchart illustrating a reverse ECMEA process 600, suitable for decrypting a message encrypted by the forward ECMEA process 300 illustrated in FIG. 3, or for encrypting a message to be subsequently decrypted by the forward ECMEA process 300 illustrated in FIG. 3. The reverse ECMEA process 600 employs a reverse transformation, followed by a CMEA iteration, followed by a reverse inverse transformation. The reverse transformation is identical to the transformation except that the reverse transformation reverses the use of the first and second secret offsets. That is, where the transformation employs the first offset, the reverse transformation employs the second offset, and where the transformation employs the second offset, the reverse transformation employs the first offset. Similarly, the reverse inverse transformation is identical to the inverse transformation except that the reverse inverse transformation reverses the use of the first and second secret offsets. That is, where the inverse transformation employs the first offset, the reverse inverse transformation employs the second offset, and where the inverse transformation employs the second offset, the reverse transformation employs the first offset.

At step 602, an unprocessed message is introduced into the encryption/decryption process. The unprocessed message may be a plaintext message to be encrypted or a received encrypted message to be decrypted. The unprocessed message may conveniently be placed in a data buffer for processing. At step 604, in systems which implement tbox as a static table rather than as a function call, the static tbox table is derived. At step 606, a set of secret values $K_0$–$K_3$ is generated for use in generating the secret offsets and the offsets are calculated. The secret values $K_0$–$K_3$ are preferably octets. The set of secret values may be generated using any of a number of techniques commonly known in the art. All the secret values $K_0$–$K_3$ are preferably generated for each wireless telephone call and are preferably constant throughout the call. First and second offsets are generated, using the following formulas:

$$\text{offset1} = ((K_0+1)*CS \bmod 257) \oplus K_1 \bmod 256$$

$$\text{offset2} = ((K_2+1)*CS \bmod 257) \oplus K_3 \bmod 256$$

where $K_0$–$K_3$ are as defined above. CS is preferably an octet implemented as a binary counter. Offset1 and offset2 are each 8-bit values.

At step 608, a reverse transformation is performed on the unprocessed message, using first and second secret offsets, to produce a reverse transformed message. Details of the reverse transformation are discussed below in connection with the discussion of FIG. 7.

At step. 610, the reverse transformed message is subjected to an iteration of the CMEA process, using a CMEA key, to produce a reverse intermediate ciphertext message. The CMEA process used may be the original process of Reeds described in connection with FIG. 1, or the modified CMEA process, described in connection with FIG. 2. The CMEA process chosen for the reverse ECMEA process must be the same as is chosen for a corresponding forward ECMEA process. The CMEA process iteration is improved by inclusion of an enhanced tbox function, which performs an involutary lookup of each octet, and is given by the formula tbox(z)=I(I(I(I(I(I(I(I(I(I(I(I(I(z+k0)XOR k1)+k2)XOR k3)+k4)XOR k5)+k6)XOR k7)–k6)XOR k5)–k4)XOR k3)–k2)XOR k1)–k0 where "+" denotes modulo 256 addition,
"–" denotes modulo 256 subtraction,
"XOR" is the XOR function,
"z" is the function argument,
k0, . . . , k7 are the eight octets of ECMEA key,
and I( ) is the outcome of the known ibox 8-bit table look-up. The ibox table is an involutary lookup table with entries chosen to perform involutary mapping of 8-bit bytes onto 8-bit bytes. A preferred example of an ibox table is as follows:

| | | | | | | | |
|---|---|---|---|---|---|---|---|
| 0xdd, | 0xf3, | 0xf7, | 0x90, | 0x0b, | 0xf5, | 0x1a, | 0x48, |
| 0x20, | 0x3c, | 0x84, | 0x04, | 0x19, | 0x16, | 0x22, | 0x47, |
| 0x6d, | 0xa8, | 0x8e, | 0xc8, | 0x9f, | 0x8d, | 0x0d, | 0xb5, |
| 0xc2, | 0x0c, | 0x06, | 0x2f, | 0x43, | 0x60, | 0xf0, | 0xa4, |
| 0x08, | 0x99, | 0x0e, | 0x36, | 0x98, | 0x3d, | 0x2e, | 0x81, |
| 0xcb, | 0xab, | 0x5c, | 0xd5, | 0x3f, | 0xee, | 0x26, | 0x1b, |
| 0x94, | 0xd9, | 0xfc, | 0x68, | 0xde, | 0xcd, | 0x23, | 0xed, |
| 0x96, | 0xc5, | 0xdc, | 0x45, | 0x09, | 0x25, | 0x4f, | 0x2c, |
| 0x62, | 0x53, | 0xbf, | 0x1c, | 0x95, | 0x3b, | 0x89, | 0x0f, |
| 0x07, | 0x56, | 0x7f, | 0xbd, | 0xaa, | 0xb7, | 0xff, | 0x3e, |
| 0x86, | 0x77, | 0x54, | 0x41, | 0x52, | 0xd4, | 0x49, | 0xb8, |
| 0xc7, | 0x9e, | 0x82, | 0x71, | 0x2a, | 0xd0, | 0x78, | 0x9c, |
| 0x1d, | 0x6a, | 0x40, | 0xae, | 0xf4, | 0xaf, | 0xf2, | 0xe9, |
| 0x33, | 0x80, | 0x61, | 0xb4, | 0xc0, | 0x10, | 0xa7, | 0xbb, |
| 0xb6, | 0x5b, | 0x73, | 0x72, | 0x79, | 0x7c, | 0x8c, | 0x51, |
| 0x5e, | 0x74, | 0xfb, | 0xe6, | 0x75, | 0xd6, | 0xef, | 0x4a, |
| 0x69, | 0x27, | 0x5a, | 0xb3, | 0x0a, | 0xe8, | 0x50, | 0xa0, |
| 0xca, | 0x46, | 0xc3, | 0xea, | 0x76, | 0x15, | 0x12, | 0xc6, |
| 0x03, | 0x97, | 0xa3, | 0xd1, | 0x30, | 0x44, | 0x38, | 0x91, |
| 0x24, | 0x21, | 0xc1, | 0xdb, | 0x5f, | 0xe3, | 0x59, | 0x14, |
| 0x87, | 0xa2, | 0xa1, | 0x92, | 0x1f, | 0xe2, | 0xbc, | 0x6e, |
| 0x11, | 0xbe, | 0x4c, | 0x29, | 0xe4, | 0xc9, | 0x63, | 0x65, |
| 0xcc, | 0xfa, | 0xf1, | 0x83, | 0x6b, | 0x17, | 0x70, | 0x4d, |
| 0x57, | 0xd3, | 0xfe, | 0x6f, | 0xa6, | 0x4b, | 0xa9, | 0x42, |
| 0x6c, | 0x9a, | 0x18, | 0x8a, | 0xd2, | 0x39, | 0x8f, | 0x58, |
| 0x13, | 0xad, | 0x88, | 0x28, | 0xb0, | 0x35, | 0xd7, | 0xe1, |
| 0x5d, | 0x93, | 0xc4, | 0xb9, | 0x55, | 0x2b, | 0x7d, | 0xce, |
| 0xe0, | 0x31, | 0xfd, | 0x9b, | 0x3a, | 0x00, | 0x34, | 0xe5, |
| 0xd8, | 0xcf, | 0xa5, | 0x9d, | 0xac, | 0xdf, | 0x7b, | 0xf9, |
| 0x85, | 0x67, | 0x8b, | 0xf6, | 0xf8, | 0x37, | 0x2d, | 0x7e, |
| 0x1e, | 0xb2, | 0x66, | 0x01, | 0x64, | 0x05, | 0xeb, | 0x02, |
| 0xec, | 0xe7, | 0xb1, | 0x7a, | 0x32, | 0xda, | 0xba, | 0x4e | where the entries are in hexadecimal format. The ibox table entries are indexed from 0x00 to 0xff. This translates into decimal 0 to 255. For the above table, the first entry in the first row is indexed 0x00, the eighth entry in the first row is indexed 0x07, the first entry in the second row is indexed 0x08, the eighth entry in the second row is indexed 0x0f, and so on. It is apparent from an examination of the table that it provides an involutary lookup. Looking up the entry indexed 0xdd, it is seen that ibox(0xdd)=0x00. The enhanced tbox function is substituted for the TBOX function described above in connection with FIGS. 1 and 2.

In order to further enhance security, the inputs to the tbox function are subjected to a permutation employing the secret offsets. Each tbox function input is subjected to a permutation to produce a permutation result. For use in the iterations of the CMEA process, the first offset is used. If a tbox function input is defined as x, for example, the permutation result is the value of (x⊕offset1) for tbox use in the CMEA processing. When the tbox function is used in the transformations or inverse transformations, one would use either (x⊕offset1) or (x⊕offset2), depending upon where it is located within the tbox function. Each of the transformations and inverse transformations, including the use of tbox permutations within the transformations and inverse transformations, is described in detail below. Each permutation result is subjected to the tbox function. Thus, for each tbox input x, the function used is tbox(x⊕offset1) or tbox (x⊕offset2). The permutation of the tbox inputs effectively causes the location of the tbox entries to shift with each message, greatly increasing the difficulty of a cryptanalytic attack. The permutation of the tbox inputs effectively causes the location of the tbox entries to shift with each message, greatly increasing the difficulty of a cryptanalytic attack.

At step 612, a reverse inverse transformation is performed on the reverse intermediate ciphertext, using first and second secret offsets, to produce a final processed text. Details of the reverse inverse transformation are discussed below in connection with the discussion of FIG. 8.

Figure 7:
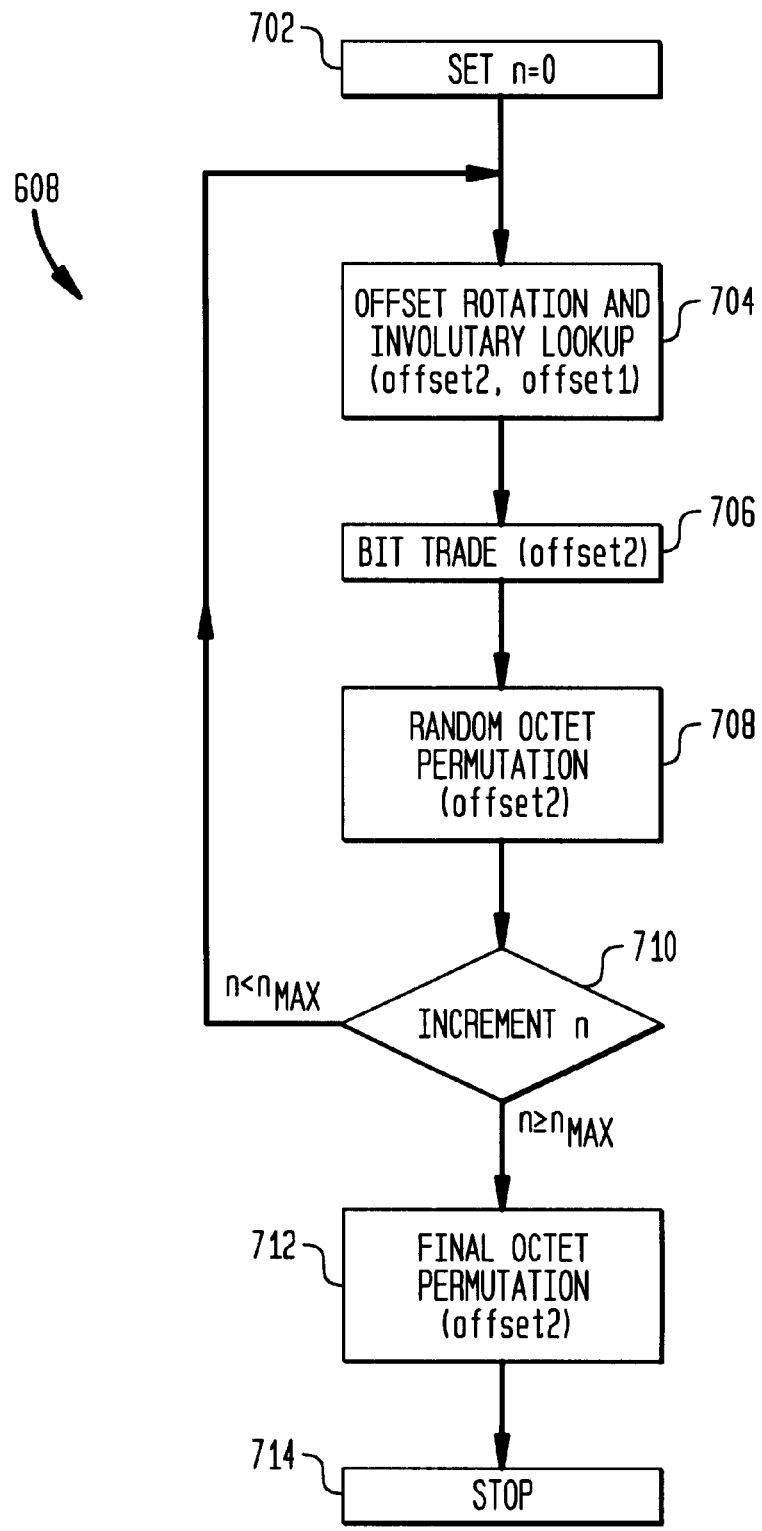
FIG. 7. is a flowchart illustrating the reverse transformation employed in the reverse ECMEA encryption method.

FIG. 7 is a flowchart illustrating in detail the steps of the reverse transformation 608 performed in the forward ECMEA process 600 illustrated in FIG. 6. The steps of the transformation 608 are performed for each octet $O_n$. $O_n$ is the nth octet of the unprocessed message. n is an integer from 0 to $n_{max}-1$, where $n_{max}$ is the number of octets in the message.

At step 702 n is set to 0. At step 704 an offset rotation and involutary lookup is performed according to the following formula:

if n>0, offset2=(offset2>>1) OR (offset2<<7)

$O_n$=offset1⊕tbox($O_n$⊕offset2), where >>1 represents a right-shift of 1 bit and <<7 represents a left-shift of 7 bits. These two shifts and the subsequent OR in the corresponding line above comprise a one-bit rotation to the right.

At step 706 a bit-trade is performed between the present octet and the one below according to the following formula:

if n>0, j=$O_{n-1}$⊕$O_n$ j=j AND tbox(j⊕offset2)

$O_n$=$O_n$⊕j where j is a temporary buffer variable.

At step 708 a random octet permutation is performed to perform an exchange of the (n−1)th octet with a random one below it, according to the following formula:

if n>1, j=tbox($O_n$⊕offset2)

j=(n*j)>>8 z=$O_j$ $O_j$=$O_{n-1}$ $O_{n-1}$=z where j and z are temporary buffer variables.

At step 710 n is incremented and compared with $n_{max}$. If n<$n_{max}$, control is transferred to step 704. If n≥$n_{max}$, control is transferred to step 712.

At step 712, a final random octet permutation to exchange the last octet with a random one below it, is performed according to the following formula:

j=tbox(0x37⊕offset2)

j=(n*j)>>8 z=$O_j$ $O_j$=$O_{n-1}$ $O_{n-1}$=z where j and z are temporary buffer variables.
At step 714 the transformation is complete.

Figure 8:
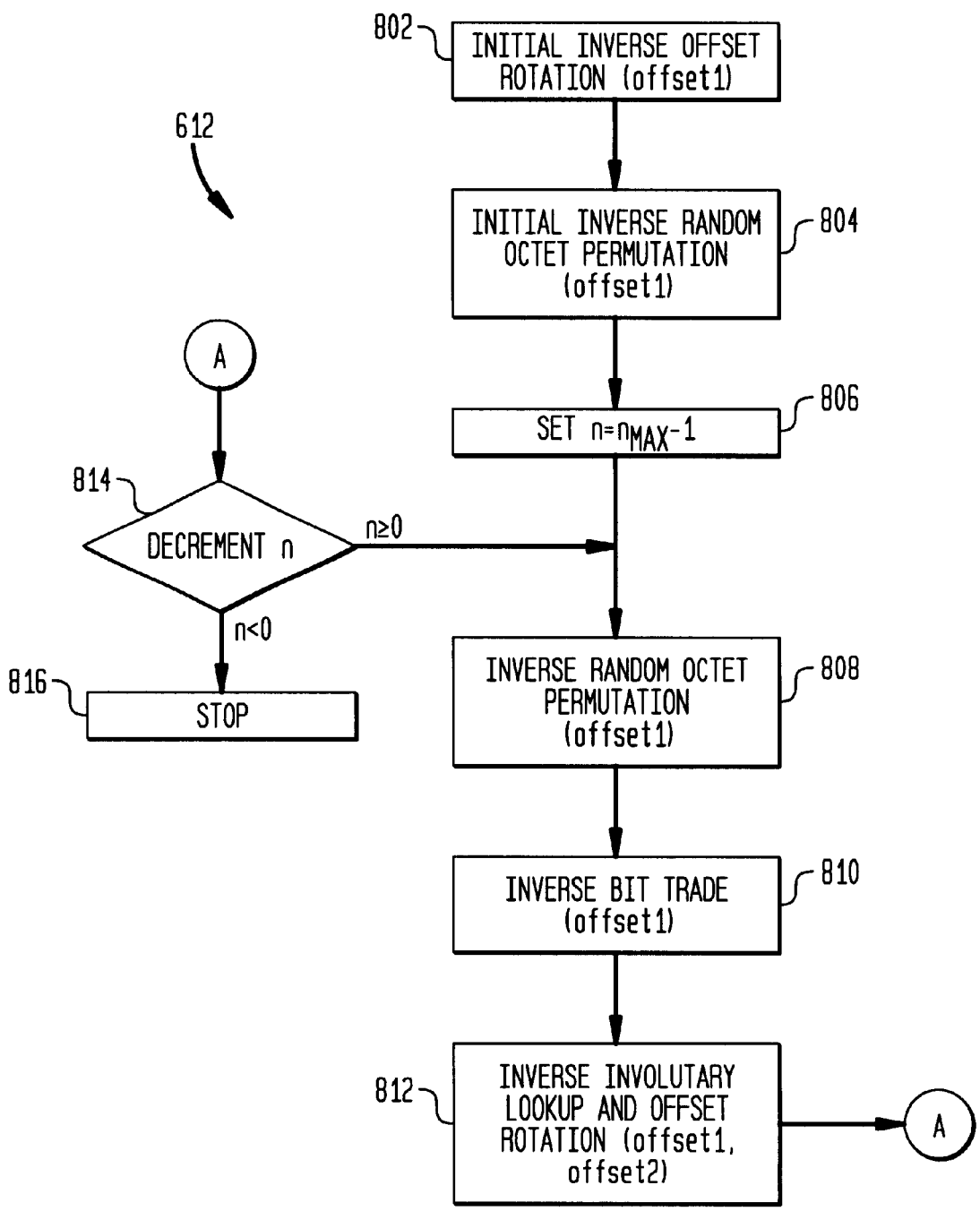
FIG. 8 is a flowchart illustrating the reverse inverse transformation employed in the reverse ECMEA encryption method.

FIG. 8 is a flowchart illustrating in detail the steps of the reverse inverse transformation 612 performed in the forward ECMEA process 600 illustrated in FIG. 6.

At step 802 an initial inverse offset rotation is performed for offset 1 according to the following formula:

j=($n_{max}$−1) AND 0x07 offset1=(offset1>>j) OR (offset1<<(8−j))

where >>j represents a right-shift of j bits, and <<(8−j) represents a left-shift of (8−j) bits. These two shifts and the subsequent OR in the corresponding line above comprise a j-bit rotation to the right.

At step 804 an initial inverse random octet permutation is performed, to exchange the last octet with a random one below it, according to the following formula:

j=tbox(0x37⊕offset1)

j=($n_{max}$*j)>>8 z=$O_j$ $O_j$=$O_{nmax-1}$ $O_{nmax-1}$=z where j and z are temporary buffer variables.

At step 806 n is set to $n_{max}$−1.

At step 808 an inverse random octet permutation is performed to exchange the (n−1)th octet with a random one below it, according to the following formula:

if n>1, j=tbox($O_n$⊕offset1)

j=(n*j)>>8 z=$O_j$ $O_j$=$O_{n-1}$ $O_{n-1}$=z where j and z are temporary buffer variables.

At step 810 an inverse bit-trade is performed between the present octet and the one below according to the following formula:

if n>0, j=$O_{n-1}$⊕$O_n$ j=j AND tbox (j⊕offset1)

$O_{n-1}$=$O_{n-1}$⊕j $O_n$=$O_n$⊕j where j is a temporary buffer variable.

At step 812 an inverse involutary lookup of the present octet and an inverse offset rotation is performed, according to the following formula:

$O_n$=offset1⊕tbox($O_n$⊕offset2)

offset1=(offset1<<1)|(offset1>>7)

where <<1 represents a left-shift of 1 bit, and >>7 represents a right-shift of 7 bits. These two shifts and the subsequent OR in the corresponding line above comprise a one-bit rotation to the left.

At step 814 n is decremented and compared to 0. If n≧0 control is transferred to step 808. If n<0 control is transferred to step 816 and the inverse transformation is completed.

FIG. 9 is a diagram showing a wireless telephone system 900 including a handset 1000 and a base station 1100. Both the handset 1000 and the base station 1100 are equipped to perform message transmission and processing according to the present invention. The telephone handset 1000 includes a transceiver 1002, an input/output (I/O) interface 1004, an encryption/decryption processor 1006, and a key generator 1008. The key generator 1008 receives and employs stored secret data for key generation. Stored secret data is preferably stored in nonvolatile memory 1010 such as an EEPROM or a Flash memory. The key generator also generates secret values $K_0$–$K_3$ used to produce offsets. The secret values are preferably octets. The key generator may be designed to generate secret values $K_0$–$K_3$ using any of a number of techniques commonly known in the art. A set of secret values $K_0$–$K_3$ is preferably generated for each wireless telephone call, and the values $K_0$–$K_3$ are preferably held constant throughout the call. The key generator 1008 stores the generated keys and secret values $K_0$–$K_3$ in memory 1012. The encryption/decryption processor also includes memory 1014 for storage of keys received from the key generator 1008, and a static tbox table which may be generated and used if it is desired to implement the tbox function as a static table. The telephone handset 1000 also includes a message generator 1016, which generates messages to be encrypted by the encryption/decryption processor 1006 and transmitted by the transceiver 1002.

When an internally generated message is to be encrypted and transmitted by the telephone handset 1000, the message is transmitted from message generator 1016 to the I/O interface 1004. The I/O interface 1004 transmits the message, along with the identification, to the encryption/ decryption processor 1006. The encryption/decryption processor 1006 receives a key from the key generator 1008, which it then uses to encrypt the message.

When the telephone handset-based encryption/decryption processor 1006 receives a plaintext message from the message generator 1016, the message is subjected to a forward ECMEA process as described above in connection with the discussion of FIG. 3. The forward ECMEA process includes a transformation, an iteration of the CMEA process, and an inverse transformation. The use of the forward ECMEA process as described above in FIG. 3 causes the location of the tbox entries to shift not merely with each message, but also for each iteration of the encryption of a single message.

Upon completion of forward ECMEA process, a final ciphertext is produced and stored in memory 1014, and also routed to the I/O interface 1004 and to the transceiver 1002 for transmission.

When an encrypted message is received by the telephone base station 1100 for the purpose of decryption, the transceiver 1102 passes it to the I/O interface 1104. The I/O interface passes the message to the encryption/decryption processor 1106. The encryption/decryption processor 1106 receives a key from the key generator 1108 and decrypts the message using the ECMEA process described above in connection with the discussion of FIG. 3. The telephone handset 1000 employs the forward ECMEA process for encrypting and decrypting messages, and is preferably adapted to communicate with the base station 1100 which employs the reverse ECMEA process, as described in connection with the discussion of FIG. 6, for encryption and decryption. The base station 1100 includes a transceiver 1102, I/O interface 1104, encryption/decryption processor 1106, key generator 1108, nonvolatile memory 1110, memory 1112, memory 1114, and message generator 1116. These components are similar to corresponding components of the handset 1000, but are configured to implement the reverse ECMEA process. Thus, a message encrypted by the handset 1000 is decrypted by the base station 1100, and a message encrypted by the base station 1100 is decrypted by the handset 1000.

Depending on speed requirements and memory constraints, the handset 1000 or the base station 1100 may be designed to implement the tbox as a function or as a static table. Implementation of tbox as a static table requires increased memory but provides greater speed.

The above-described enhancements to the CMEA process, while substantially increasing security, do not substantially increase processing or system resources, and are therefore well suited to use in an environment such as a wireless telephone system. Both mobile and base station units in such systems often have limited processing power.

While the present invention is disclosed in the context of a presently preferred embodiment, it will be recognized that a wide variety of implementations may be employed by persons of ordinary skill in the art consistant with the above discussion and the claims which follow below.

We claim:

1. A method of forward enhanced CMEA cryptoprocessing for each message in a call, for use in a CMEA encryption system employed in a wireless telephone system comprising the steps of:

introducing an unprocessed message;

creating one or more secret offsets;

performing a transformation on the unprocessed message to produce a transformed message;

performing an iteration of a CMEA process on the transformed message to produce an intermediate ciphertext message, the iteration of the CMEA process employing an enhanced tbox function using an involutary lookup, the tbox function receiving inputs, the inputs to the enhanced tbox function being subjected to a permutation using one or more of the secret offsets to produce a permutation result; and performing an inverse transformation on the intermediate ciphertext message to produce a final processed message.

2. The method of claim 1 wherein the one or more secret offsets include a first and a second secret offset.

3. The method of claim 2 wherein the step of generating each of the first and second offsets includes combining ones of a plurality of secret values with a cryptosynchronization value.

4. The method of claim 3 wherein the secret values are octets.

5. The method of claim 4 wherein the cryptosynchronization value is an 8-bit value.

6. The method of claim 5 wherein the call comprises n unprocessed messages, a first offset for an nth unprocessed message of the call comprising an offset1 expressed by the equation offset1=$((K_0+1)*CS \bmod 257) \oplus K_1 \bmod 256$, where $K_0$ and $K_1$ are ones of the secret values and CS is the cryptosynchronization value for the nth unprocessed message, and a second offset for the nth message of the call comprising an offset2 expressed by the equation offset2=$((K_2+1)*CS \bmod 257) \oplus K_3 \bmod 256$, where $K_2$ and $K_3$ are ones of the secret values and CS is the cryptosynchronization value for the nth unprocessed message.

7. The method of claim 6 wherein the transformation includes performing the steps of involutary lookup and offset rotation, bit-trading, and random octet permutation on each octet of the unprocessed message, wherein the steps of bit-trading and random octet permutation each employ the first secret offset, and wherein the step of involutary lookup employs each of the first and second secret offsets.

8. The method of claim 7 wherein the inverse transformation includes the steps of initial inverse offset rotation, inverse random octet permutation, inverse bit-trading, and inverse involutary lookup and inverse offset rotation on each octet of the intermediate ciphertext message, wherein the inverse random octet permutation and inverse bit-trading each employ the second secret offset, and wherein the step of inverse involutary lookup employs each of the first and second secret offsets.

9. A method of reverse enhanced CMEA cryptoprocessing for each message in a call, for use in a CMEA encryption system employed in a wireless telephone system, comprising the steps of:
introducing an unprocessed message;
creating one or more secret offsets;
performing a reverse transformation on the unprocessed message to produce a reverse transformed message;
performing an iteration of the CMEA process on the reverse transformed message to produce an reverse intermediate ciphertext message, the iteration of the CMEA process employing an enhanced tbox function using an involutary lookup, the inputs to the enhanced tbox function being subjected to a permutation using one or more of the secret offsets to produce a permutation result; and
performing a reverse inverse transformation on the intermediate ciphertext message to produce a final processed message.

10. The method of claim 9 wherein the one or more secret offsets include a first and a second secret offset.

11. The method of claim 10 wherein the step of generating each of the first and second offsets includes combining ones of a plurality of secret values with a cryptosynchronization value.

12. The method of claim 11 wherein the secret values are octets.

13. The method of claim 12 wherein the cryptosynchronization value is an 8-bit value.

14. The method of claim 13 wherein the call comprises n unprocessed messages, the first offset for an nth message of the call comprising an offset1 expressed by the equation offset1=$((K_0+1)*CS \bmod 257) \oplus K_1 \bmod 256$, where $K_0$ and $K_1$ are ones of the secret values and CS is the cryptosynchronization value for the nth unprocessed message, and wherein the second offset for the nth message of the call comprises an offset2 expressed by the equation offset2=$((K_2+1)*CS \bmod 257) \oplus K_3 \bmod 256$, where $K_2$ and $K_3$ are ones of the secret values and CS is the cryptosynchronization value for the nth unprocessed message.

15. The method of claim 14 wherein the reverse transformation includes the steps of performing offset rotation and involutary lookup, bit-trading, and random octet permutation on each octet, wherein the steps of bit-trading and random octet permutation each employ the second secret offset, and wherein the step of involutary lookup employs each of the first and second secret offsets.

16. The method of claim 15 wherein the reverse inverse transformation includes the steps of initial inverse offset rotation, inverse random octet permutation, inverse bit trading, and inverse involutary lookup and inverse offset rotation on each octet of the intermediate ciphertext message, wherein the inverse random octet permutation and inverse bit-trading each employ the first secret offset, and wherein the step of inverse involutary lookup employs each of the first and second secret offsets.

17. A wireless handset for securely transmitting messages, comprising:
a transceiver;
an input/output interface;
a key generator for generating one or more keys to be used during a call; and
a cryptoprocessor for receiving from the input/output interface a message to be encrypted or decrypted together with identification of the message as plaintext to be encrypted or ciphertext to be decrypted and processing the message as using a forward enhanced CMEA process including a transformation, a CMEA iteration including an enhanced tbox function with inputs permuted by one or more secret offsets, the enhanced tbox function employing an involutary lookup table, and an inverse transformation, the encryption/decryption processor being further operative to return the encrypted or decrypted message to the input/output interface for further routing.

18. A wireless base station for securely transmitting messages, comprising:
a transceiver;.
an input/output interface;
a key generator for generating one or more keys to be used during a call; and
a cryptoprocessor for receiving from the input/output interface a message to be encrypted or decrypted together with identification of the message as plaintext to be encrypted or ciphertext to be decrypted and processing the message as using a reverse enhanced CMEA process including a reverse transformation, a CMEA iteration including an enhanced tbox function with inputs permuted by one or more secret offsets, the enhanced tbox function employing an involutary lookup table, and a reverse inverse transformation, the encryption/decryption processor being further operative to return the encrypted or decrypted message to the input/output interface for further routing.

* * * * *